United States Patent [19]

Schult

[11] Patent Number: 5,034,899

[45] Date of Patent: Jul. 23, 1991

[54] SOFTWARE TOOL FOR AUTOMATICALLY GENERATING A FUNCTIONAL-DIAGRAM GRAPHIC

[75] Inventor: Uwe Schult, Untersiggenthal, Switzerland

[73] Assignee: BBC Brown Boveri AG, Baden, Switzerland

[21] Appl. No.: 441,215

[22] Filed: Nov. 27, 1989

Related U.S. Application Data

[63] Continuation of Ser. No. 163,117 filed as PCT CH86/00094 on Jul. 7, 1986, abandoned.

[51] Int. Cl.[5] .............................................. G06F 15/62
[52] U.S. Cl. ..................................... 364/518; 364/488
[58] Field of Search ................ 364/518, 521, 146, 147, 364/191, 488, 900 MS File

[56] References Cited

U.S. PATENT DOCUMENTS

| | | | |
|---|---|---|---|
| 4,326,207 | 4/1982 | Suda et al. | 364/900 |
| 4,445,169 | 4/1984 | Wakita et al. | 364/147 |
| 4,630,219 | 12/1986 | DiGiacomo et al. | 364/488 |
| 4,710,863 | 12/1987 | Kaufman et al. | 364/146 |
| 4,752,887 | 6/1988 | Kuwahara | 364/488 X |

FOREIGN PATENT DOCUMENTS 0200974 11/1986 European Pat. Off. .

Primary Examiner—Dale M. Shaw
Assistant Examiner—Mark K. Zimmerman
Attorney, Agent, or Firm—Oblon, Spivak, McClelland, Maier & Neustadt

[57] ABSTRACT

A software process for automatically generating a functional diagram graphic, which can be used for automatically generating functional diagrams from a control program for a stored-program control system on a graphical display device, particularly a programming device for such a control system. The functional diagrams generated have a high information density. They can contain signal branchings and signal crossings and function blocks with several outputs further connected to other function blocks.

1 Claim, 4 Drawing Sheets

SOFTWARE TOOL FOR AUTOMATICALLY GENERATING A FUNCTIONAL-DIAGRAM GRAPHIC

This application is a continuation of application Ser. No. 163,117, filed as PCT CH86/00094 on Jul. 7, 1986, now abandoned.

TECHNICAL FIELD

The present invention relates to a software process for automatically generating a functional-diagram graphic. The invention particularly relates to a software process by means of which the functional-diagram graphic is generated from a partially sorted set of function blocks having one or more inputs and outputs on a graphical display device.

PRIOR ART

Software processes of the above type are needed in programming devices for stored-program control systems. In modern automatic control engineering, a programming device for a stored-program control system is understood to be a small data processing system of compact construction and therefore easily transportable which can be connected to a plurality of various control systems via a standardized interface. In the programming device, all functions are combined which are required for generating and maintaining the control programs for the stored-program control systems. This is why the corresponding functions do not need to be provided in the control systems themselves.

To facilitate the programming work for the control technician, comfortable programming devices allow programming directly at the functional-diagram level, that is to say in a type of representation which is particularly familiar to the control technician. For this purpose, the functional diagram of the respective control system is represented on a graphical display device of the programming device and the user can carry out changes or additions in the functional diagram by means of simple commands. The control program associated with the functional diagram is automatically generated by the programming device without any intervention by the user. Conversely, the programming device automatically generates from an already existing machine-readable stored control program the associated functional diagram on the display device. Within the programming device, this is carried out by the software tool under consideration here which, for example, can be implemented as so-called firmware in the programming device.

In general, the control programs are generated with a modular structure in programming devices of the type considered. They contain individual functions which are called up via function calls. The function calls, in turn, contain a list of the input and output parameters of the functions. In the functional diagram, the functions are represented by function blocks which are generally rectangular. The inputs and outputs correspond to the input and output parameters of the functions in the control program. Their mutual interdependence is expressed by connecting lines in the functional diagram.

To generate the functional-diagram graphic, the software tool contained in the programming device must analyze the control program for the functions contained in it. As a rule, the control program will be contained in a memory in the programming device. The functions contained in the control program are identified by the software tool by means of their function calls. A list of function blocks needed for representing the functions found in the functional diagram is created by the software tool in a separate memory area in the same order in which the function calls are located in the control program, and thus in a partial order predetermined by the control program. In addition to the function blocks themselves, the inputs and outputs are also entered in the list. As explained, these correspond to the input and output parameters of the functions. The partially sorted set of function blocks contained in the list contains all information items needed for generating the required functional-diagram graphic.

A programming device employing a software process of the type described is known, for example, from U.S. Pat. No. 4,445,169. The user can also generate the control program for the stored-program control system directly in the functional diagram in the case of the known programming device. The known programming device, however, operates with a functional-diagram representation of highly restricted universality. The individual function blocks only have one single output which is connected further. They are exclusively linked with each other in a strictly hierarchical order There are therefore no signal branchings and signal crossings in the functional diagram. If, for example, one and the same output signal of a function block is needed as input signal by two other function blocks, which is frequently the case, two separate subfunction diagrams are generated by the known programming device on the display device to avoid signal branchings. This greatly impairs clarity and, especially, the information density of the picture shown. Clarity and information density of the picture shown, however, are decisive factors for the handling and user friendliness of the programming device. Since the efficiency of program generation and program maintenance and thus the rational processing of the automation tasks increasingly depends on simple handling and high user friendliness, the generation of functional-diagram representations with a higher information density is urgently required. Naturally, it should also be possible to represent function blocks with several outputs which can be connected further in the functional diagram and, correspondingly, to use functions with several output parameters in the control program.

The problem presented with the automatic generation of more complicated functional diagrams having a higher information density is the higher computing effort required for this purpose in the programming device. However, the computing capacity available in a compact transportable programming device is restricted and cannot be easily expanded.

SUMMARY OF THE INVENTION

The present invention has the task of specifying a software process of the type initially mentioned by means of which functional diagrams of the desired information density and containing function blocks having several outputs which can be connected further can be generated and which operates in such an efficient manner that it can also be implemented on a compact transportable programming device having the currently usual computing capacity.

The task mentioned and other tasks are achieved in accordance with the present invention by specifying a novel software process for automatically generating a functional-diagram graphic including the following steps: distributing the function blocks in a recursive process in accordance with their hierarchical order in the partially sorted set with increasing order from right to left in columns; establishing, within the columns, the position and size of the function blocks by positioning their inputs and outputs, first the inputs and then the outputs being positioned; establishing, during the positioning of the inputs and outputs, a course of the connecting lines leading to and from the inputs and outputs in keeping with a predetermined rule; determining if an input of a function block depends on an output of another function block, and if so positioning first all inputs and outputs of said another function block, together with their associated connecting lines in a recursive process up to said output; and representing all the connecting lines as horizontal lines, with the exception that only connecting lines between an output and one or more inputs which had been positioned at a different height contain a vertical section; and determining an occurrence of a conflict between an output of a first function block and an input of a second function block when the line coming from the output or the line leading to the input, although not a connecting line between an output or one or more inputs, cannot be represented only horizontally, and when the conflict is so determined, repositioning all inputs and outputs already positioned in connection with said function blocks, said function blocks being positioned in the reverse order.

BRIEF DESCRIPTION OF THE DRAWING

Further features and advantages of the present invention are found in the subsequent detailed description, particularly taking into consideration the attached drawings in which.

DETAILED DESCRIPTION OF THE PREFERRED EMBODIMENT

Figure 1:
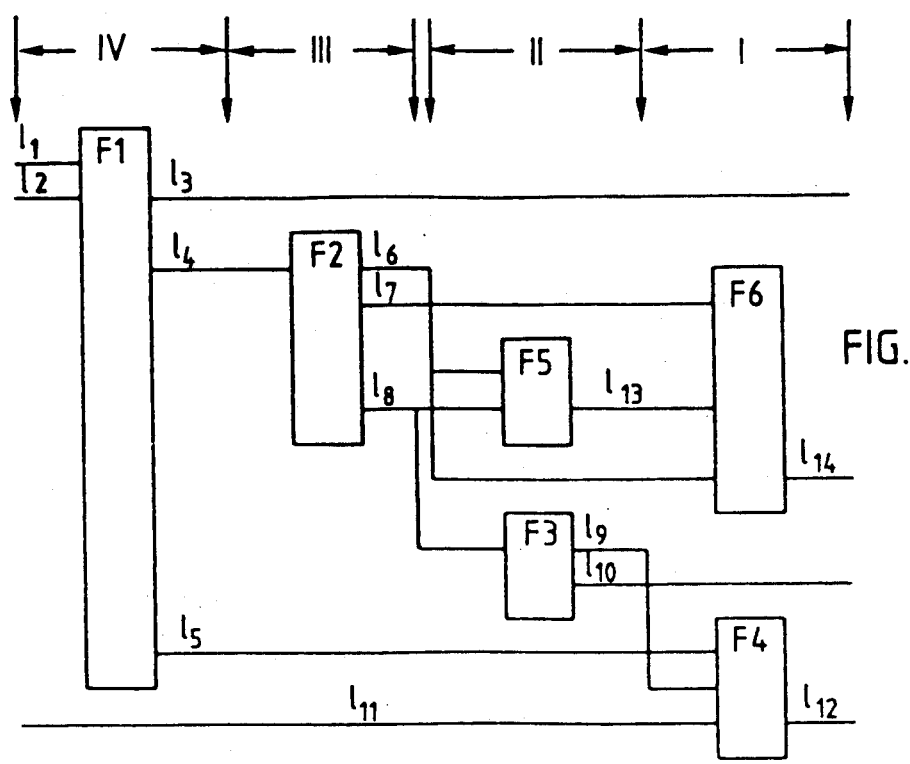
FIG. 1 shows a functional diagram which can be automatically generated with a software process in accordance with the present invention and which has a high information density and function blocks having several outputs which are further connected.

Reference is now made to the drawing. The functional diagram of FIG. 1 is based on the following partially sorted set of function blocks of which it is to be assumed that it was obtained in the manner already described by analysis of a control program for a stored-program control system:

$F_1$ ($l_1$, $l_2$; $l_3$, $l_4$, $l_5$)
$F_2$ ($l_4$; $l_6$, $l_7$, $l_8$)
$F_3$ ($l_8$; $l_9$, $l_{10}$)
$F_4$ ($l_5$, $l_9$, $l_{11}$; $l_{12}$)
$F_5$ ($l_6$, $l_8$; $l_{13}$)
$F_6$ ($l_7$, $l_{13}$, $l_6$; $l_{14}$)

In this set, as in the drawing, $F_i$ (i=1 to 6) describe the function blocks. $l_j$ (j=1 to 14), on the one hand, describe their inputs as far as they are located in front of the semicolon and, on the other hand, their outputs if they are located after the semicolon. In the drawing, $l_j$ describe the lines coming from the corresponding outputs or the lines leading to the corresponding inputs, respectively. Where inputs and outputs are designated by the same $l_j$, they are connected with each other by a connecting line designated by the relevant $l_j$ in the functional-diagram graphic.

In the text which follows, a detailed description is given how the functional diagram represented in FIG. 1 can be generated from the above set of function blocks by a software tool in accordance with the present invention.

The software tool initially distributes function blocks $F_i$ to columns in accordance with their hierarchical order in the partially sorted set. In these columns they are also displayed in the functional diagram on the graphical display device in increasing order from right to left.

The hierarchical order of the function blocks is determined by a recursive check of the further connection of their outputs to inputs of other function blocks. The hierarchical order of the function blocks corresponds to the maximum so-called recursive depth which has been achieved during the recursive check of further connections. The process of sorting a function block into the columns can also be described in such a manner that a function block on which no other function block depends is ordered into the extreme right-hand column. A function block on which other function blocks depend is arranged one column further to the left than the furthest left function block depending on it.

Figure 2:
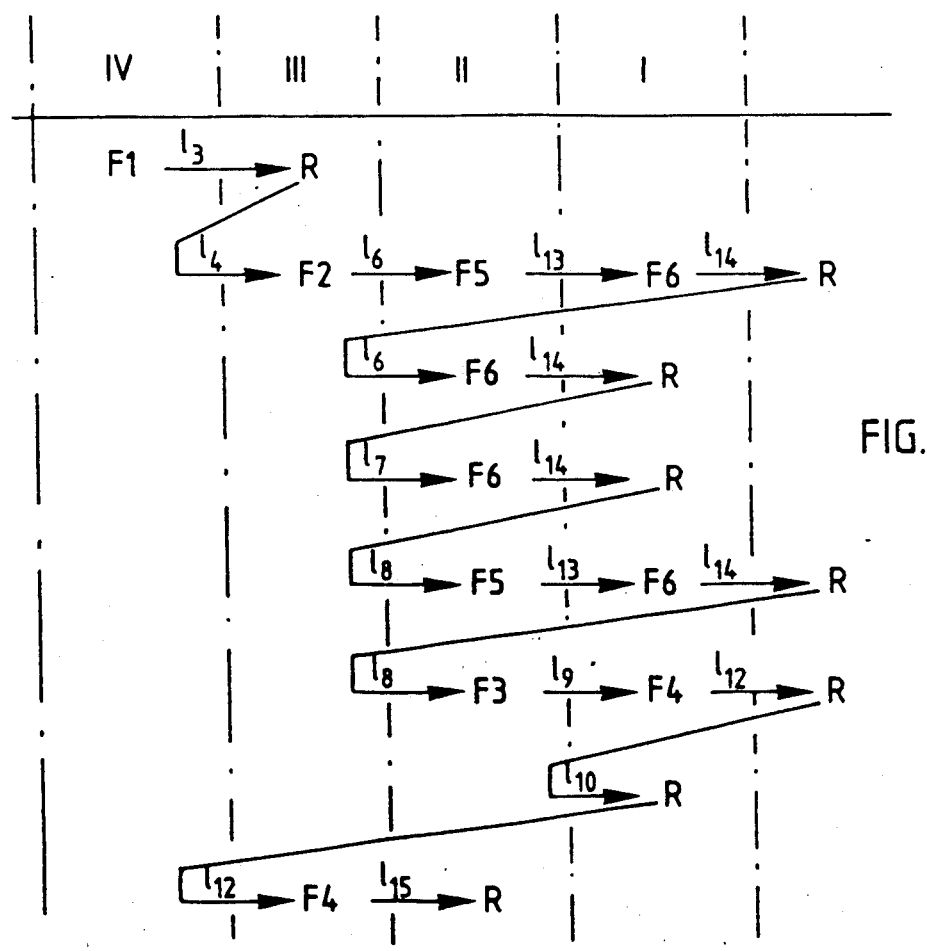
FIG. 2 shows in a schematic diagram a recursion path for arranging function block $F_1$ of FIG. 1 in the columns.

In FIG. 2, a possible recursion path coming from its first output $l_3$ and in which, by the way, recursion paths for all other function blocks are also included is represented for function block $F_1$. The recursion path is marked by the arrows shown. The arrows are designated by the "$l_j$" (in this case meant as designation of the outputs of function blocks $F_j$). An arrow leading to an "R" is meant to indicate that the corresponding output is no longer further connected to an input of another function block but that the line coming from it in the functional diagram leads to the right-hand edge of the functional diagram. This is already the case, for example, with the first output $l_3$ of $F_1$. The second output $l_4$ of $F_1$ leads to function block $F_2$. Before the third output $l_5$ of $F_1$ is checked (right at the bottom in FIG. 2), the sorting process is continued with function block $F_2$ in accordance with the recursive method which leads to function block $F_5$ and so forth. As can be seen from FIG. 2, a maximum recursive depth of 3 is obtained for function block $F_1$ in the case of the example, for example via the following relationship: $F_1$ is depended on by, among others, $F_2$, $F_2$ is depended on by, among others, $F_5$ and $F_5$ is depended on by $F_6$. $F_6$, as $F_4$, is not depended on by any further function blocks. If the latter is sorted into the column furthest to the right, for example a column I, function block $F_1$ would have to be sorted three columns further to the left and, accordingly, into a column IV. The column order of the other function blocks is obtained analogously. Overall, a column arrangement according to the following Table is obtained:

| IV | III | II | I |
|---|---|---|---|
| $F_1$ | $F_2$ | $F_5$ | $F_6$ |
|  |  | $F_3$ | $F_4$ |

Within the columns, the position of the function blocks is established by the software tool by vertical positioning of their inputs and outputs, first the inputs and then the outputs being positioned. During the positioning of the inputs and outputs, the course of the connecting lines leading to them or coming from them is established at the same time as far as possible. If an input of a function block depends on an output of another function block, first all inputs and outputs of the other function block, together with the associated connecting lines up to the output mentioned are positioned. This process again is recursive. The connecting lines are represented as horizontal lines. It is only connecting lines between an output and one or several inputs which were positioned at different height which contain a vertical section. In each such individual case, the software tool will attempt to avoid the vertical section in the connecting line by stretching one of the function blocks in a vertical direction.

The preceding will be explained again in detail with the aid of the example selected. For this purpose, reference will first be made again to FIG. 1.

Beginning, for example, with function block $F_6$ (in column I), the software process will first attempt to position its first input $l_7$. However, this input depends on the output of function block $F_2$ of the same name (in column III). Before input $l_7$ of $F_6$ can be positioned, therefore, function block $F_2$ with its inputs and outputs up to and including output $l_7$ must first be positioned. Checking of the first (and only) input $l_4$ of $F_2$ results in this, too, being dependent, namely on the output of function block $F_1$ of the same name (in column IV). Positioning of the first input $l_4$ of $F_2$ must also be deferred, therefore, until all inputs and output of $F_1$ up to and including output $l_4$ of $F_1$ are positioned. Thus, the program goes to the first input $l_1$ of $F_1$. Since function block $F_1$ belongs to the furthest left-hand column IV, input $l_1$, as all inputs of $F_1$, depends on no other function block. $l_1$ can therefore be actually positioned as first input.

For the positioning, the following items must still be established:

Shape of the function blocks, particularly their width relative to the width of the columns, Minimum spacing between the connecting lines in the vertical direction below each other and with respect to the function blocks, Possibly the amount by which the function blocks project above their top input or below their bottom output, respectively, minimum mutual spacing between function blocks arrangement of the outputs of the function blocks relative to their inputs, arrangement of vertical sections in the connecting lines where required.

In the functional diagram of FIG. 1, the function blocks are shown as rectangles having a uniform width but different length. The width corresponds to $\frac{1}{3}$ of the column width. The function blocks are arranged in the center of the columns which are indicated by the arrows in the top section of FIG. 1. The length of the function blocks depends on the number and the arrangement of their inputs and outputs. A unit distance has been selected for the minimum spacing between the connecting lines, from these to the function blocks and for the overhang of the function blocks past their top input and bottom output. Function blocks arranged below each other also have this unit distance as minimum spacing. The first, that is to say top output of the function blocks is positioned at the same level as their last, that is to say bottom input. The vertical sections in the connecting lines extend along the column boundaries. FIG. 1 shows a special feature between columns II and III which is still to be explained. Naturally, this type of representation is only by way of example. Other spacings and overhangs could be established just as well.

Figure 3:
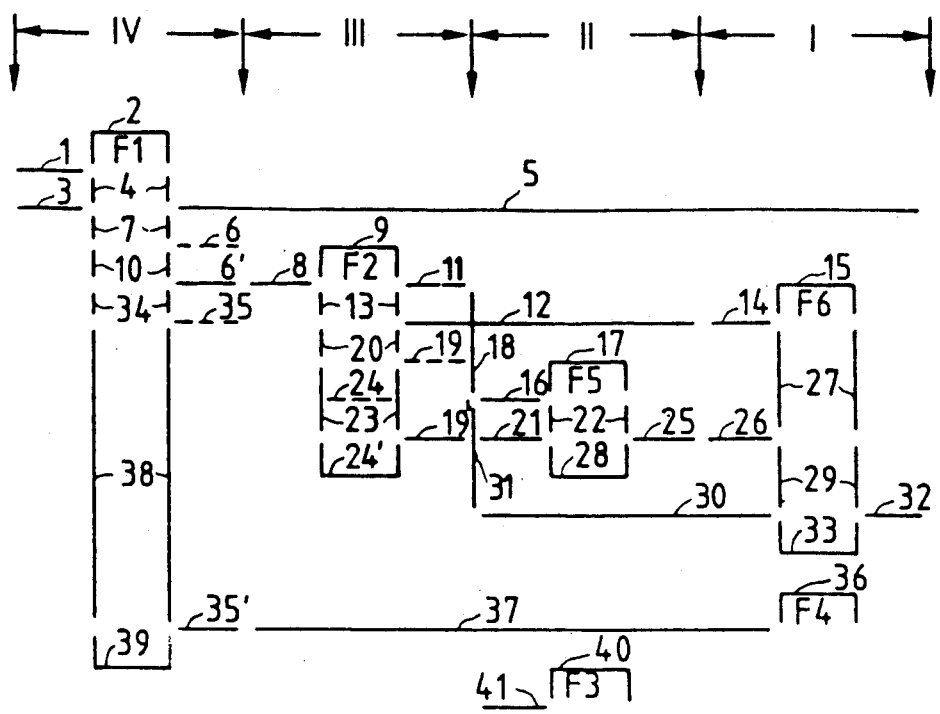
FIGS. 3 to 5 show in three diagrams the step-by-step positioning of line sections of the functional diagram of FIG. 1 during its generation.

Returning now to input $l_1$ of $F_1$, this is the first, that is to say top input of $F_1$. $l_1$ is therefore positioned one unit distance lower than the top edge of $F_1$. $F_1$ itself belongs to column IV. Due to this positioning, input $l_1$ of $F_1$, the line leading to it and the "head" of function block $F_1$ is already established. Reference is now made to FIG. 3. FIG. 3 shows, marked by the dot-dashed lines, the four columns I to IV required for representing the functional diagram selected as example. In FIG. 3, the abovementioned, first-positioned elements are represented by the line sections designated by 1 and 2. These and all other line sections still to be discussed are shown slightly offset with respect to each other so that they can be distinguished from each other in FIG. 3.

As the next step, input $l_2$ of $F_1$ can be positioned, one unit distance below $l_3$. This establishes the line sections designated by 3 and 4 in FIG. 3. $l_2$ is the last input of $F_1$. Therefore, $l_3$ can now be positioned as first output of $F_1$, at the same level as $l_2$. $l_3$ is to be connected to no other input. Coming from it, a horizontal line, line 5 in FIG. 3, extends through all columns right to the righthand edge of column I.

Output $l_4$ of $F_1$ must now be positioned. However, $l_4$ must be further connected, namely to the first (and only) input of $F_2$ of the same name. This input has not yet been positioned. At the moment, therefore, output $l_4$ and the connecting line coming from it can only be temporarily positioned and only partially as far as the connecting line is concerned. Output $l_4$ is temporarily positioned one unit distance below output $l_3$. Since function block $F_2$ belongs to adjacent column III, the line coming from $l_4$ is established only up to the column boundary between column IV and column III, see line section 6 in FIG. 3. $F_1$ can be completed by line sections 7. Line section 6 is shown in dashes because of the temporary nature of its establishment.

The positioning of output $l_4$ described, even if it is only temporary, creates the prerequisite for the positioning of $F_2$ which has initially been deferred. Input $l_4$ to be connected to the output of $F_1$ of the same name is the first or top input of $F_2$. $F_2$ must therefore have one unit distance overhang over $l_4$. The line coming from output $l_3$ of $F_2$, line 5 in FIG. 3, already uses up space in column II which must now be taken into consideration. The top edge $F_2$ must be spaced away by at least one unit distance from the said line. This results in the line sections designated by 8 and 9 in FIG. 3 for the line leading to input $F_4$ of $F_2$ and the head $F_2$.

Output $l_4$ of $F_1$ could now be connected to input $l_4$ of $F_2$. As can be seen in FIG. 3, however, the said output and the said input were positioned at different height. Their direct connection would result in a vertical section. As explained, however, the positioning of output $l_4$ of $F_1$ was only temporary. A check is now carried out to see whether the vertical line can be avoided by stretching $F_1$. This is the case here since $F_1$ has not yet been closed towards the bottom and output $l_5$, which is located below $l_4$, and on which such stretching could have an effect, is not yet positioned. The stretching results in line sections 6' and 10 in FIG. 3. Line section 6' replaces line section 6.

Since $l_4$ is the only input of $F_2$, its first output $l_6$ can be immediately considered. $l_6$ must be further connected, namely to the inputs of $F_5$ and $F_6$ of the same name. $l_6$ is therefore positioned only temporarily, namely to the same height as the first (and last) input of $F_2$. The line coming from $l_6$ can only be established up to the column boundary between column III and column II since function block $F_5$ belongs to column II. This results in line section 11 in FIG. 3.

As the next step, output $l_7$ will be dealt with. The consideration arrived at function block $F_2$ via this output, namely via the attempt to position the input of $F_6$ of the same name. Output $l_7$ of $F_2$ must be further connected to this input. $l_7$ is now positioned one unit distance below $l_6$, also only temporarily. The connecting line coming from it is established up to the column boundary between column I and II because $F_6$ belongs to column I. The line sections marked by 12 and 13 in FIG. 3 are obtained.

It is now possible to carry out what had been attempted right at the start, namely the positioning of input $l_7$ of $F_6$. To avoid a vertical section in the connecting line between it and the output of $F_2$ of the same name, it is positioned to the same vertical height as the latter. A corresponding space is available in column I, also with respect to the top overhang of function block 6 above its top input. Line sections 14 and 15 in FIG. 3 are obtained The positioning is continued with the second input $l_{13}$ of $F_6$. $l_{13}$ depends on the output of $F_5$ of the same name. Thus, $F_5$ must first be positioned up to its output $l_{13}$. This is again begun with the first input $l_6$ of $F_5$. This depends on the output of $F_2$ of the same name. However, output $l_6$ of $F_2$ has already been positioned, compare line section 11 in FIG. 3. For this reason, the position of input $l_6$ of $F_5$ can now be directly established. $F_5$ belongs to column II. Initially, it is attempted to position input $l_6$ of $F_5$ at the same height as output $l_6$ of $F_2$. However, due to the fact that space has already been used in column II by the connecting line corresponding to line section 12, this is not possible. Input $l_6$ of $F_5$ must be positioned below this connecting line by two unit distances Two unit distances are required so that the head or top overhang of function block $F_5$ can also be accommodated The line sections marked by 16 and 17 in FIG. 3 are obtained.

Output $l_6$ of $F_2$ and the input of $F_5$ of the same name which must be linked to each other were therefore positioned at a different height. It must therefore be checked again whether a vertical connecting line which would be required as a result of this can be avoided by stretching one of the function blocks. Only function block $F_2$ can be considered here. However, it is not possible to stretch it since its output $l_7$ has already been positioned below its output $l_6$ and has also been further connected. This positioning and further connection remains untouched. A vertical connecting line is therefore unavoidable in this case. The result is line section 18 in FIG. 3.

Next, input $l_8$ of $F_5$ is considered. This is dependent on the output of $F_2$ of the same name. Output $l_8$ of $F_2$ has not yet been positioned. Before $l_8$ is positioned, all inputs and all outputs of $F_2$ coming before $l_8$ must be positioned. However, this has already been done in the present case. For this reason, $l_8$ can be directly positioned. $l_8$ is temporarily positioned one unit distance below $l_7$. In FIG. 3, this results in the dashed line section 19 and in line sections 20. $l_8$ is the last output of $F_2$ which is why $F_2$ is (temporarily) closed towards the bottom by a lower overhang 24.

With the positioning of output $l_8$ of $F_2$, the program leaves $F_2$ again and returns to input $l_8$ of $F_5$. Input $l_8$ of $F_5$ is positioned one unit distance below input $l_6$. This results in line sections 21 and 22 in FIG. 3.

Now, input $l_8$ of $F_5$ must be connected to the output of $F_2$ of the same name. Since both were positioned at different height, a vertical connecting line would be required again in this case. But in the present case, this can be avoided again by stretching function block $F_2$. This results in line sections 23, 19' and 24' in FIG. 3. Line section 19' replaces line section 19. Line section 24' replaces line section 24. $l_8$ is the last output of $F_2$. $l_8$ is finally positioned after $F_2$ has been stretched.

Positioning is continued with output $l_{13}$ of $F_5$. It is temporarily arranged at the same height as input $l_8$, compare line section 25 in FIG. 3. This creates the prerequisite for the previously deferred positioning of the second input $l_{13}$ of $F_6$. This is simply positioned at the same height as output $l_{13}$ of $F_5$ and can be directly connected to the latter In FIG. 3, this results in line sections 26 and 27. The temporary positioning of output $l_{13}$ of $F_5$ has thus become definitive. Since $l_{13}$ is the last output of $F_5$, $F_5$ can be closed at the bottom which results in line section 28 in FIG. 3.

The procedure is continued with the third input $l_6$ of $F_6$ strictly in accordance with the scheme previously used. This input depends on the output of $F_2$ of the same name which, however, has already been established and, among other things, was further connected to $F_5$. Input $l_6$ of $F_6$ can therefore be immediately positioned. Care must be taken that the connecting line leading to it must pass through column II at least one unit distance below the bottom edge of $F_5$ since this determines the space al-ready used up in column II. This results in the line sections marked 29 and 30 in FIG. 3. Finally, the link to output $l_6$ of $F_2$ must still be established. This again necessitates a vertical line. Since output $l_1$ has already been positioned below output $l_6$ of $F_2$ and has been further connected, stretching to avoid the vertical connecting line can no longer be considered. This results additionally or as extension of the vertical line section 18 in FIG. 3 in the vertical line section 31 on the column boundary between columns II and III.

$l_6$ was the last input of $F_6$. Therefore, its first and only output $l_{14}$ can now be considered. It is positioned at the same height as input $l_6$. Since the connecting line coming from $l_{14}$ leads to the right-hand edge of the functional-diagram graphic, that is to say no longer to another input of another function block, the positioning of $l_{14}$ is definitive. For this reason, function block $F_6$ can also be closed at the bottom at the same time. Line sections 32 and 33 are the result in FIG. 3.

After treatment of function block $F_6$ has been completed, the procedure is continued with the next function block of the extreme right-hand column, function block $F_4$.

The first input $l_5$ of $F_4$ depends on the output of $F_1$ of the same name. This must still be positioned. It is temporarily positioned one unit distance below output $l_4$, compare line section 34 and the dashed line section 35 in FIG. 3.

Input $l_5$ of $F_4$ can now be positioned. Taking into consideration the minimum distance of two function blocks from each other and the overhang of a function block above its top input, line sections 36 and 37 are obtained in FIG. 3. Line section 37 passes through the two columns III and II so far "at the bottom" that there are no space problems. Naturally, this would have to be taken into consideration if necessary. Finally, stretching of function block $F_1$ again avoids a vertical connecting line in the attempt of connecting input $l_5$ of $F_4$ with the output of $F_1$ of the same name. This results in line sections 38 and 35' in FIG. 3. Line section 35' replaces line section 35 drawn in dashes.

Output $l_5$ is the last output of $F_1$ and is now also definitively positioned. For this reason, $F_1$ can be closed at the bottom which results in line section 39 in FIG. 3.

The procedures continue with the second input $l_9$ of $F_4$. This depends on the input of $F_3$ of the same name.

There has been no positioning as yet with respect to $F_3$. This must therefore be done next. A start is made with the first input $l_8$ of $F_3$. This, in turn, depends on the output of $F_2$ of the same name. However, output $l_8$ of $F_2$ has already been positioned so that input $l_8$ of $F_3$ can be immediately established, nevertheless. Taking into consideration the minimum spacing between a function block and a connecting line and the over-hang of a function block above its top input, line sections 40 and 41 in column II are obtained in FIG. 3.

Figure 4:
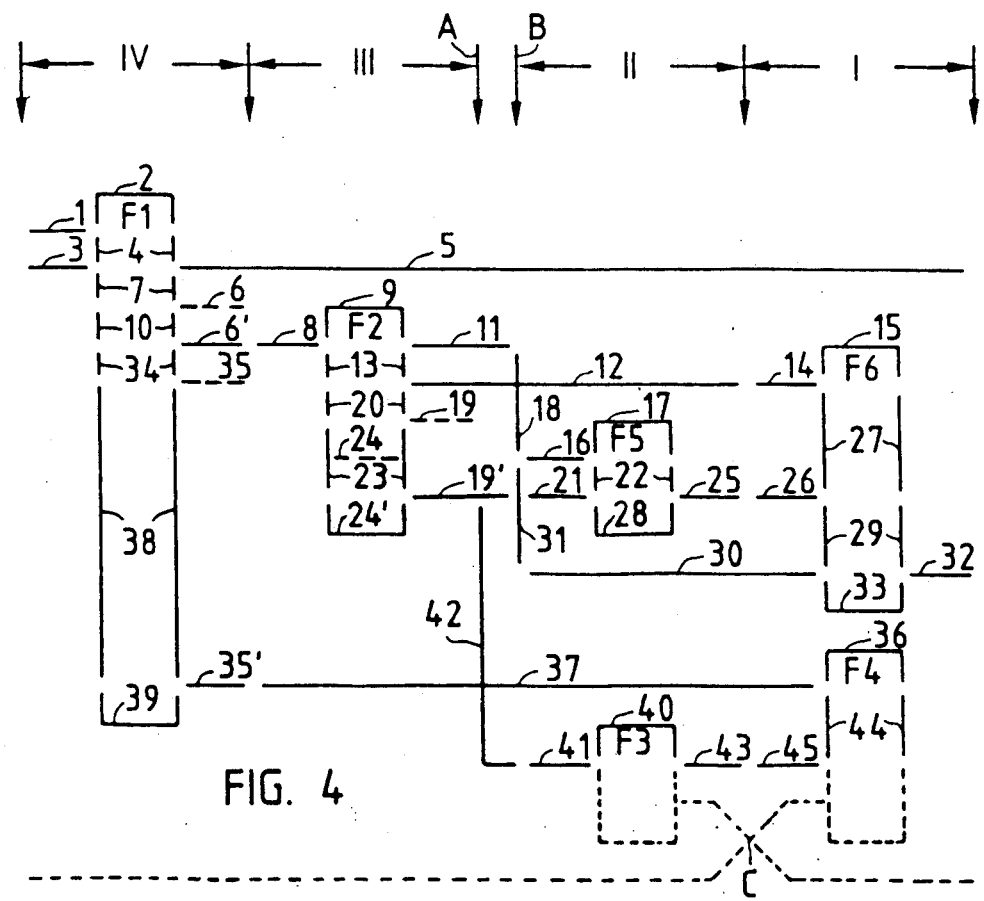

Thus, input $l_8$ of $F_3$ has been positioned lower than the output of $F_2$ of the same name. It is not possible to stretch function block $F_2$ in this case since the positioning of output $l_8$ is already definitive because of its further connection to the input of $F_5$ of the same name. For this reason, a vertical connecting line is required for connecting input $l_8$ of $F_3$ to output $l_8$ of $F_2$. However, with respect to this vertical connecting line, the problem arises that a vertical connecting line, line section 31 in FIG. 3, is already provided on the column boundary between column II and III in a part section of the said vertical connecting line to be established. Naturally, there are, in principle, several possibilities for avoiding mutual overlapping of the two vertical connecting lines. Preferably, columns II and III are moved slightly apart as shown in FIG. 4. This results in two column boundaries A, B on which the two vertical connecting lines can extend in parallel with each other. On column boundary A, the new line section 42 is obtained in FIG. 4. Line sections $l_8$ and 31 already previously established extend along column boundary B. Should there be an overlap of three or even more vertical lines, space can be made in corresponding manner for all vertical lines by moving the adjacent columns even further apart.

In the text which follows, the explanation of the positioning process is continued with the aid of FIG. 4. FIG. 3 is still incomplete.

Next the first output $l_9$ of $F_3$ is considered. It is positioned to the same height as input $l_8$, only temporarily, because it must still be connected further to the input of $F_4$ of the same name. This latter is also positioned to the same height. Overall, line sections 43 to 45 are obtained in FIG. 4.

The third input $l_{11}$ of $F_4$ does not depend on any other function block. This means that the line leading to it must pass through columns IV, III and II. A problem arises in column II. The said line would have to be run along below the as yet unclosed function block $F_3$ which is still open towards the bottom. Considering again in advance function block $F_3$ with respect to its as yet unpositioned outputs, it can be seen that there is only one output, namely output $l_{10}$, but this does not have to be further connected to any other function block. Accordingly, on account of the previous positioning, the line coming from it would have to be run past below function block $F_4$ which has also not yet been closed towards the bottom to the right-hand edge of the graphic. This would result in a situation as is shown in dashes at the bottom of FIG. 4, involving a crossing of lines at the point marked C. Such a situation is not desirable.

To solve the problem which has arisen, a repositioning is carried out. This repositioning involves the inputs and outputs of the function blocks between which the problem has occurred, in this case function blocks $F_3$ and $F_4$ including all connecting lines which have been established during this process. These are all line sections starting from section 36 in FIG. 3 and 4, line section 35' also being included.

During the repositioning, the function blocks concerned are considered in the reverse order. If the procedure was originally started at the first input $l_5$ of $F_4$ and $F_3$ was considered only via the attempt of positioning the second input $l_9$ of $F_4$, the start is now made with $F_3$ before any part of $F_4$ is positioned. This method is used in principle for all problems or conflicts of the above type which have occurred (even when they are nested inside each other).

There are no processes or problems which have not yet been described above with respect to the positioning now starting at the first input $l_8$ of $F_3$ so that the individual steps do not need to be explained.

Figure 5:
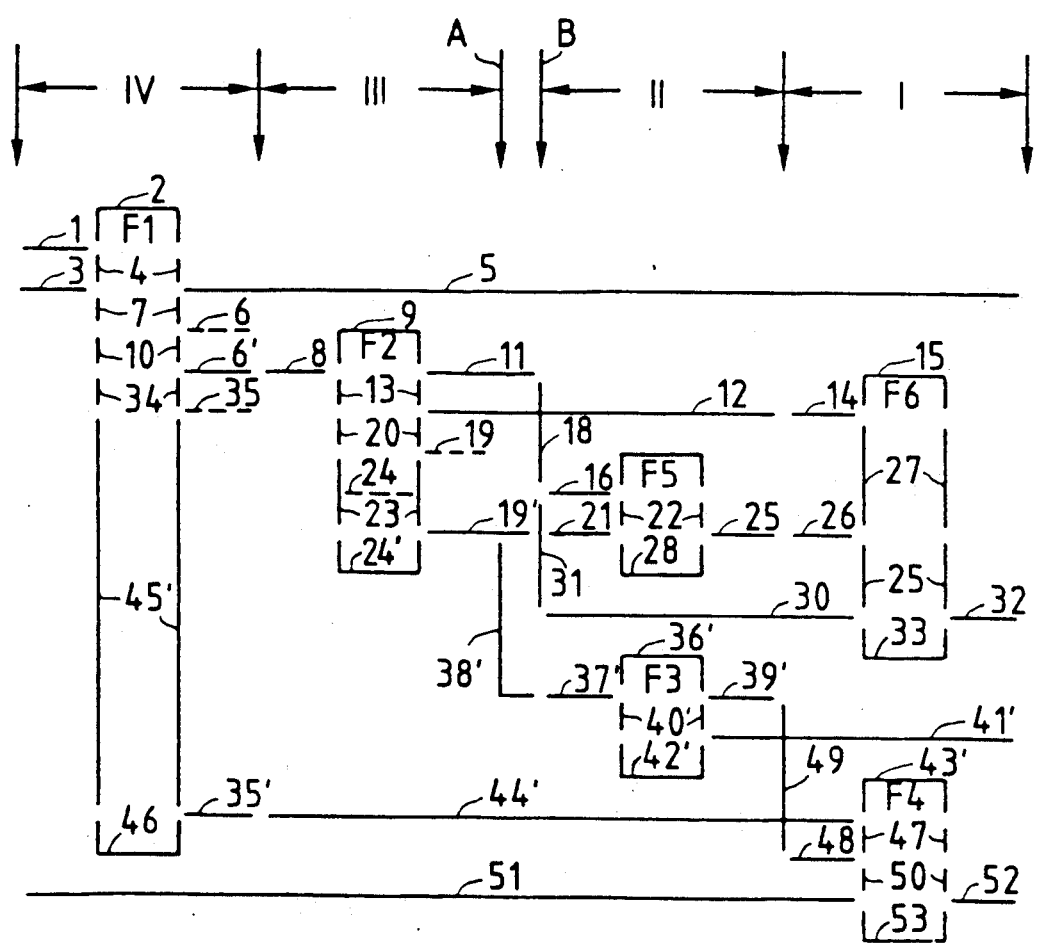

The new line sections resulting from the repositioning are shown in FIG. 5. These are line sections 36' to 53, including 35'. They are marked with an apostrophe if they replace line sections already positioned before the repositioning.

As can be seen from FIG. 5, it was possible to solve the previous problem by repositioning. All elements of the functional diagram have been positioned with line section 53 of FIG. 5. FIG. 5 recognizably corresponds to FIG. 1.

Figure 6:
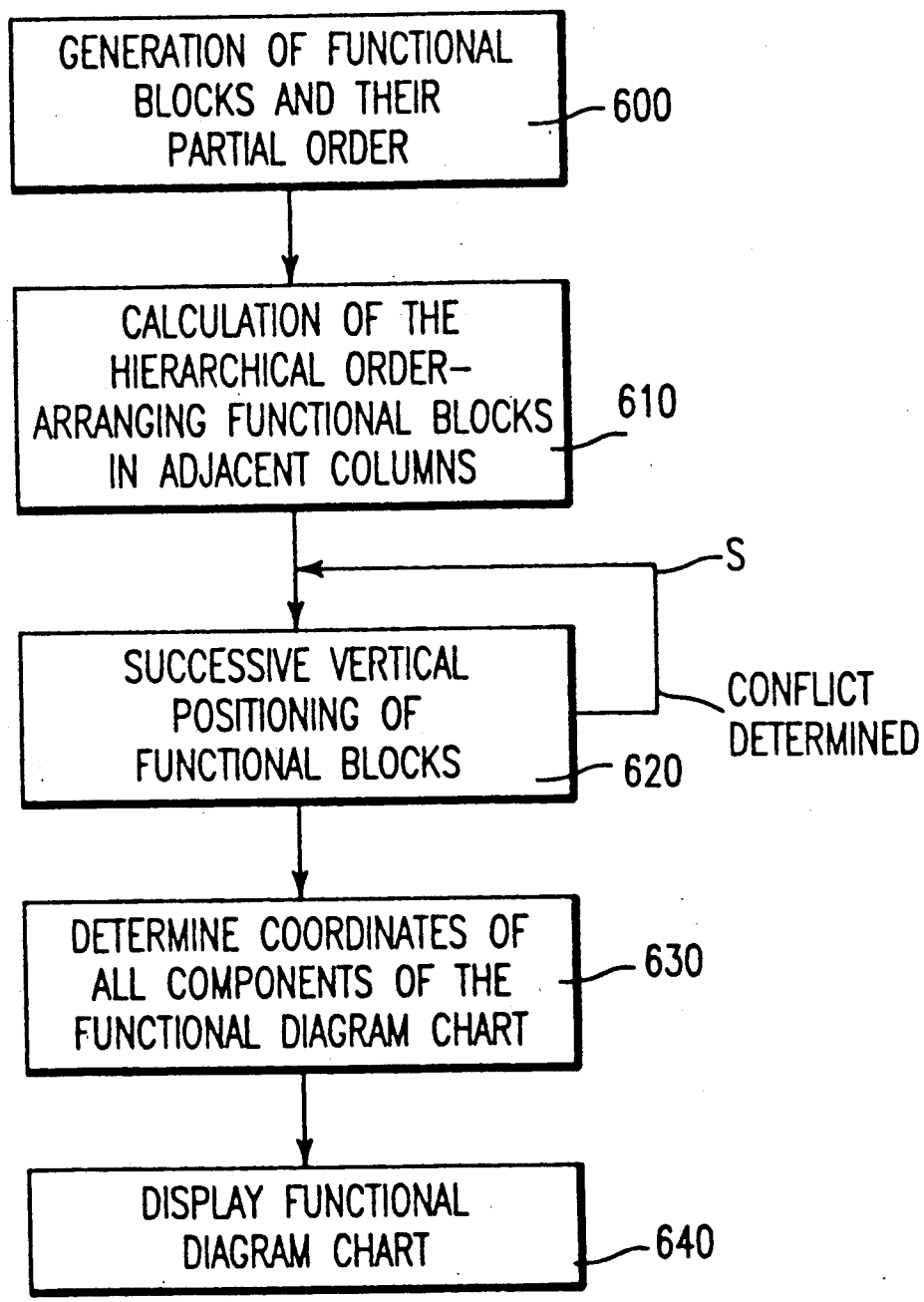
FIG. 6 is a flow chart showing processing according to the present invention.

FIG. 6 illustrates a flow chart of the process performed according to the invention. In FIG. 6, in step 600 there is performed a step of generation of the functional blocks and their partial order. In step 610, the hierarchical order of the functional blocks is calculated, i.e., the functional blocks are arranged in adjacent columns. In step 620, there is performed successive vertical positioning of the functional blocks in accordance with the rules above-described. If a conflict is determined to exist during the processing, the conflict is eliminated by a loop S, i.e., the placing of the functional blocks involved in conflict is interchanged. In step 630, the coordinants of all components of the functional diagram chart are determined, and in step 640 the functional diagram chart produced according to the invention is displayed.

I claim:

1. Programming unit for memory-programmable controls in which, for automatically generating a control system flowchart from a control program, a software tool is stored, in particular as firmware, in which, by analysis of the control program, a sequenced number of functional blocks ($F_1$–$F_6$) is obtained, each of which exhibits one or more inputs and outputs ($l_1$–$l_{14}$) and which is further processed by the software tool in the following steps:

these functional blocks ($F_1$–$F_6$) are distributed according to their sequence from right to left in columns (I–IV) of a graphic display unit that can be divided into vertical columns;

within columns (I–IV) the functional blocks are positioned from top to bottom according to their sequence;

the vertical spread of the functional blocks ($F_1$–$F_6$) is established by positioning their inputs and outputs, with first the inputs and then the outputs being positioned;

during positioning the inputs and outputs, at the same time the course of the connecting lines leading to and coming from the inputs and outputs is established at least temporarily to the extent that positioning of the functional blocks is known;

the connecting lines are represented as horizontal lines and only connecting lines between an output and one or more inputs that are positioned at different vertical positions contain an additional vertical section;

the functional blocks are extended in the vertical direction so that vertical sections in connecting lines are avoided, unless in doing so the positions of already definitively positioned inputs or outputs are affected;

if vertical sections of connecting lines should coincide, the control system flowchart is spread in the horizontal direction so that space for a parallel course of the vertical sections is produced;

if an input of one functional block depends on an output of another functional block, first all inputs and outputs of said another functional block are positioned;

if a conflict occurs between an output of a first functional block and an input of a second functional block, which conflict is produced because the line coming from the output or the line leading to the input, although not the connecting line between an output an done or more inputs, cannot be represented only horizontally, a new positioning of all inputs and outputs of said first functional block and said second functional block is performed, and said functional blocks thereafter being positioned in reverse sequence.

* * * * *

UNITED STATES PATENT AND TRADEMARK OFFICE
CERTIFICATE OF CORRECTION

PATENT NO. : 5,034,899

DATED : July 23, 1991

INVENTOR(S) : Uwe Schult

It is certified that error appears in the above-identified patent and that said Letters Patent is hereby corrected as shown below:

On the title page,
The Related U.S. Application Data is incorrect, should be,

--Continuation of Ser. No. 163,117 filed Feb. 10, 1988, as PCT CH86/00094 on Jul. 7, 1986, abandoned--.

Signed and Sealed this

Eighth Day of February, 1994

*Attest:*

BRUCE LEHMAN

*Attesting Officer*    Commissioner of Patents and Trademarks